United States Patent [19]
Ma

[11] Patent Number: 6,031,714
[45] Date of Patent: Feb. 29, 2000

[54] PORTABLE FLAT DISPLAY DEVICE

[76] Inventor: His Kuang Ma, 4F, No.48, Sec. 2, Chung Cherning Rd., Taipei, Taiwan

[21] Appl. No.: 08/986,773

[22] Filed: Dec. 8, 1997

[51] Int. Cl.[7] .................................. G06F 1/16; G06F 1/00
[52] U.S. Cl. ........................... 361/681; 248/918; 248/924
[58] Field of Search .................... 361/681; 248/917–919, 248/922–924; 349/58

[56] References Cited

U.S. PATENT DOCUMENTS

| | | | |
|---|---|---|---|
| 4,438,458 | 3/1984 | Munscher | 361/687 |
| 5,255,214 | 10/1993 | Ma | 361/681 |
| 5,582,373 | 12/1996 | Baudot | 361/681 |
| 5,668,570 | 9/1997 | Ditzik | 361/681 |
| 5,799,372 | 9/1998 | Brunner et al. | 248/917 |
| 5,812,368 | 9/1998 | Chen et al. | 361/681 |
| 5,831,696 | 11/1998 | Sheng | 349/58 |
| 5,899,421 | 5/1999 | Haneda et al. | 248/918 |
| 5,900,848 | 5/1999 | Silverman | 361/681 |

*Primary Examiner*—Leo P. Picard
*Assistant Examiner*—Lisa Lea-Edmonds
*Attorney, Agent, or Firm*—Dougherty & Troxell

[57] ABSTRACT

A portable flat display device which includes a flat display having a display frame and a display module mounted within the display frame, a support pivoted to the display frame and adapted to turn between a first position where the support is received in a flat receiving space at the back side of the display module within the display frame, and a second position where the support is turned out of the flat receiving space for supporting the flat display in a tilted position, and a foot plate pivoted to the support for supporting it on a flat surface.

5 Claims, 2 Drawing Sheets

6,031,714

PORTABLE FLAT DISPLAY DEVICE

BACKGROUND OF THE INVENTION

The present invention relates to a portable flat display device, and more particularly to such a portable flat display device which is equipped with a collapsible support and a footplate.

Regular computer monitors are commonly heavy, and not portable. They cannot be conveniently adjusted to the desired view angle. Furthermore, regular flat displays for notebook computer are not detachable when installed, and therefore these flat displays cannot be used to match different computers.

SUMMARY OF THE INVENTION

The invention provides a portable flat display device which can be used with any computer. The portable flat display device comprises a flat display which includes a display frame and a display module mounted within the display frame; an electric connector connected to the display module by an electric cable and adapted for connection to a display output connector of a computer, the display frame comprising a transverse axle housing near a bottom side thereof, and two recessed holes at two opposite ends of the transverse axle housing; a support pivoted to the transverse axle housing of the display frame, the support comprising two parallel arms each having a front end inserted into one of the recessed holes on the display frame, a transverse pivot shaft inserted through the transverse axle housing and fixedly connected between the front ends of the parallel arms for permitting the support to be turned about an axis between a first position where the support is received within a flat receiving space defined within the display frame at the back side of the display module, and a second position where the support is turned out of the flat receiving space; and a foot plate pivoted to the support between the parallel arms.

BRIEF DESCRIPTION OF THE DRAWINGS

In order that the present invention may more readily be understood the following description is given, merely by way of example with reference to the accompanying drawings, in which.

DETAILED DESCRIPTION OF THE PREFERRED EMBODIMENT

Referring to Figures from 1 to 4, a potable flat display device in accordance with the present invention is generally comprised of a flat display 1, a support 2, and a foot-plate 3.

Figure 2:
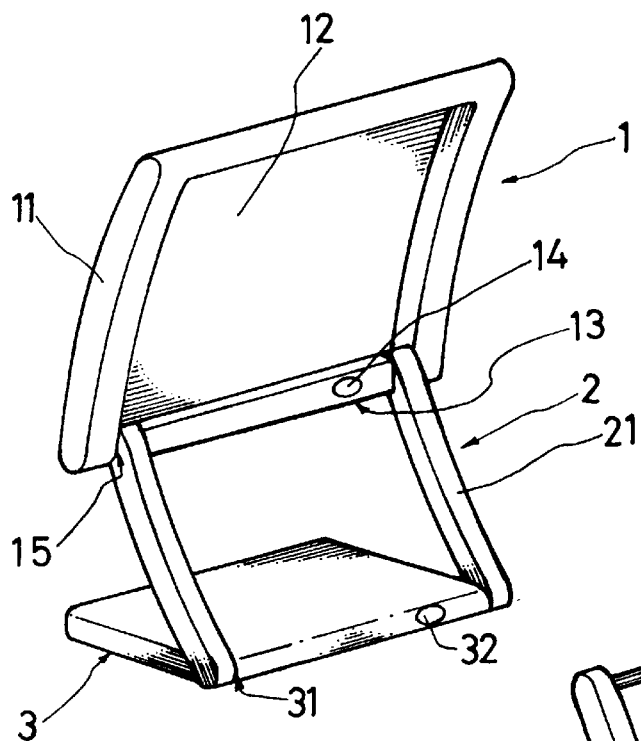
FIG. 2 is another perspective view of the portable flat display device shown in FIG. 1 taken from another angle.
Figure 3:
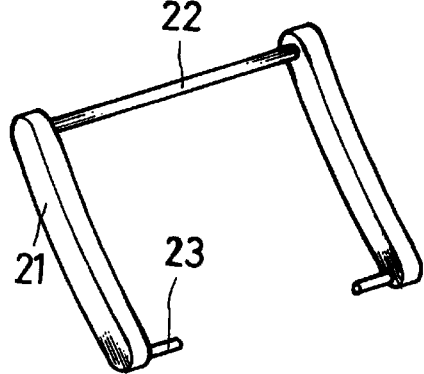
FIG. 3 is a perspective view of the support for the portable flat display device according to the present invention.

The flat display 1 comprises a display frame 11, and a display module 12 mounted within the display frame 11. The display frame 11 defines a space at the back side of the display module 12 for receiving the support 2 when the portable flat display device is collapsed (see FIGS. 2 and 4). The display frame 11 comprises a transverse axle housing 13 at the bottom of its back side, two recessed holes 15 at two opposite ends of the transverse axle housing 13, and an electric connector 14 mounted on the outside of the transverse axle housing 13 and connected to the display module 12 by an electric cable. The electric connector 14 is provided for connection to a display output connector of a computer.

The support 2 which is pivotally connected between the foot plate 3 and the flat display 1, is comprised of two parallel arms 21, a transverse pivot shaft 22 connected between the parallel arms 21 at one end, and two pivot pins 23 respectively raised from the arms 21 at one end remote from the transverse pivot shaft 22 and facing each other. The transverse pivot shaft 22 is inserted through the axle housing 13 on the display frame 1. The arms 21 are respectively inserted into the recessed holes 15 on the display frame 11 and fixedly connected to the two opposite ends of the pivot shaft 22. The pivot pins 23 are respectively coupled to two pivot holes (not shown) at two opposite sides of the foot plate 3, for permitting the support 2 to be turned about the axis which passes through the pivot holes on the foot plate 3.

Figure 1:
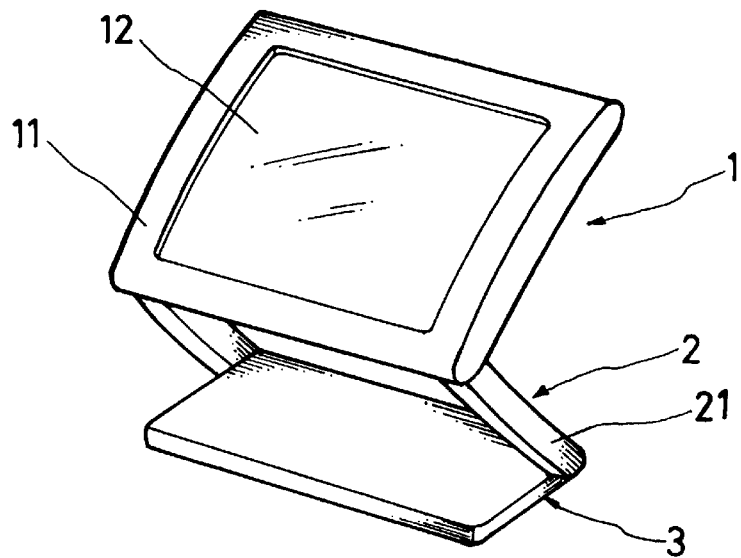
FIG. 1 is a perspective view of a portable flat display device according to the present invention.
Figure 4:
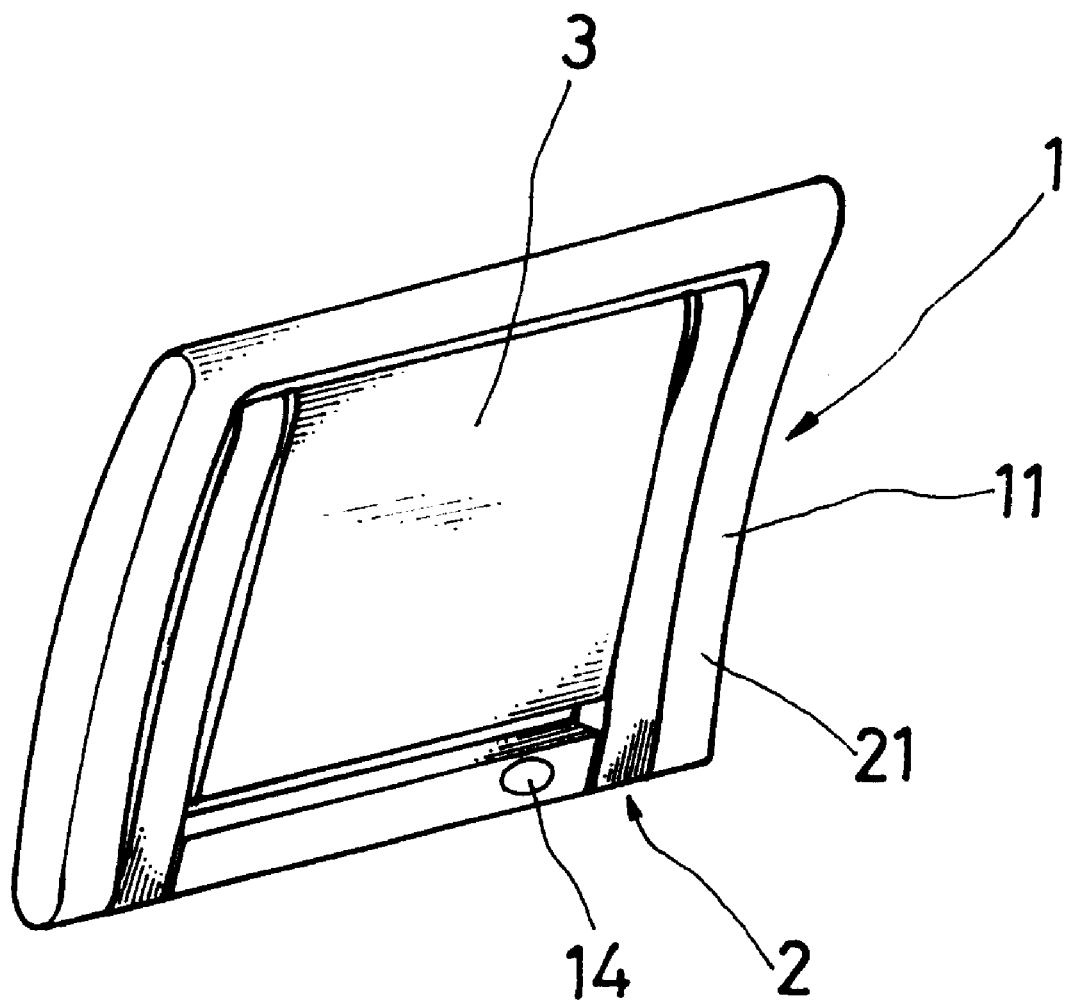
FIG. 4 shows the portable flat display device collapsed.

When the portable flat display device is not in use, the foot plate 3 is turned about the pivot pins 23 and received within the support 2, and then the foot plate 3 with the support 2 are turned inward toward the flat display 1 and received in the space defined within the display frame 11 and closely attached to the back side of the display module 12 (see FIG. 4). When in use, the support 2 is turned outward from the back side of the display module 12, and then the foot plate 3 is turned out of the support 2 for supporting the whole assembly on a flat surface (see FIGS. 1 and 2).

Friction means may be provided so that the support 2 can be retained at the desired angle relative to the flat display 1 or the foot plate 3. An electric connector 32 may be mounted on the foot plate 3 and connected to the display module 12 by an electric cable passing through a cable hole (not shown) in one arm 21 of the support 2.

It is to be understood that the drawings are designed for purposes of illustration only, and are not intended as a definition of the limits and scope of the invention disclosed.

What is claimed is:

1. A portable flat display device comprising:

a flat display, said flat display comprising a display frame, a display module mounted within said display frame, an electric connector connected to said display module by at least one electric cable and adapted for connection to a display output connector of a computer, a recessed receiving space bounded by said display frame at a back side of said flat display the recessed receiving space having width and height dimensions, said display frame comprising a transverse axle housing adjacent to a bottom side thereof, and recessed holes at two opposite ends of said transverse axle housing;

a support pivotally attached to said transverse axle housing of said display frame, said support comprising two parallel arms, the parallel arms being spaced apart a distance less than the width dimension of the recessed receiving space, each arm having a first end inserted into one of the respective recessed holes of said transverse axle housing, a transverse pivot shaft extending through said transverse axle housing and fixedly connected to the first ends of said parallel arms enabling said support to be pivoted about the transverse pivot shaft between a first position where both of said arms are received within said recessed receiving space, and a second position where said arms extend from said display frame; and a foot-plate pivotally attached to said support between said spaced apart parallel arms, the foot-plate having a width less than a distance between the spaced apart parallel arms and a length less than the height of the recessed receiving space enabling the foot-plate to be received in the recessed receiving space between the parallel arms when the support is in the first position.

2. The portable flat display device of claim 1, wherein said electric connector of said flat display is mounted on said display frame outside said transverse axle housing.

3. The portable flat display device of claim 1, wherein one of said arms of said support has a cable hole, and wherein said electric connector is mounted on said foot plate, and said electric cable is inserted through a cable hole on one arm of said support.

4. The portable flat display device of claim 1, further comprising first friction means adapted to stop said support at a desired angle relative to said flat display, and second friction means adapted to stop said support at a desired angle relative to said foot plate.

5. The portable flat display device of claim 1, wherein said foot plate comprises two pivot holes at two opposite sides; said parallel arms of said support each having a pivot pin disposed at one end remote from said transverse pivot shaft and respectively coupled to the pivot holes on said foot plate.

* * * * *